UNITED STATES PATENT OFFICE.

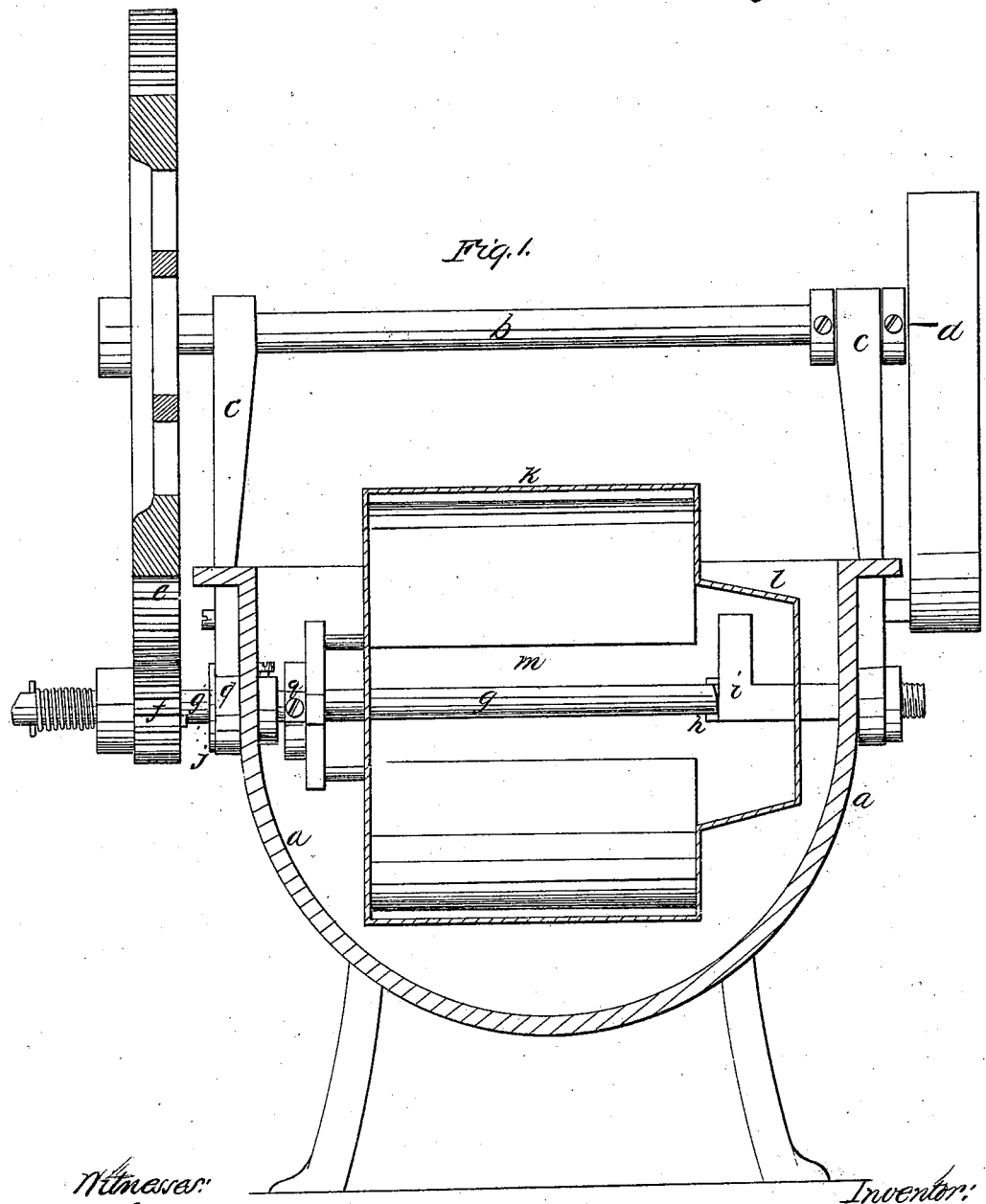

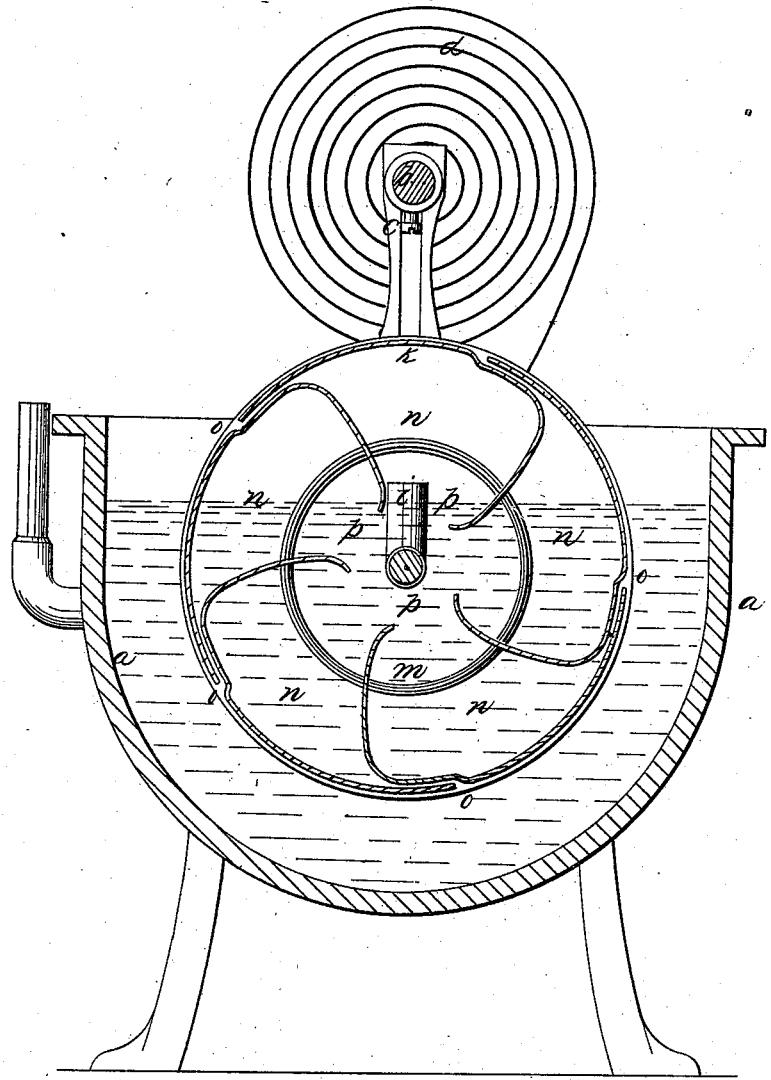

J. F. BIRCHARD, OF MILWAUKEE, WISCONSIN.

IMPROVED APPARATUS FOR FORCING AIR IN CARBURETING-MACHINES.

Specification forming part of Letters Patent No. 54,491, dated May 8, 1866.

*To all whom it may concern:*

Be it known that I, J. F. BIRCHARD, of the city of Milwaukee, in the State of Wisconsin, have invented a certain new and useful Improvement on Air-Feeders to Carbureting Air Apparatus; and I do hereby declare that the following is a full, clear, and exact description of the construction and operation of the same, reference being had to the accompanying drawings, and to the letters and marks thereon.

In the class of air-feeders to which this invention relates it is very important that as much as is possible of their construction and arrangement should be open to the atmosphere and exposed to view, so that it can be readily seen and ascertained whether the air is being fed in regularly and in the measured quantities desired, and whether the water or liquid which is contained in the reservoir or chamber to form the liquid joint is of the proper height and quantity and in the required condition to secure the efficient working of the feeder.

The drawings forming part of this specification represent a rotary feeder contained in a suitable vessel for holding the water, Figure 1 of these drawings being a view, by vertical section, in line with the main shaft of the feeder, and Fig. 2 being a view, also by vertical section, at right angles to the main shaft.

In both of these figures where like parts are shown like marks and letters are used to indicate the parts.

The vessel $a$ here shown is made of cast-iron, but may be made of any other suitable material, and may be of such other form than that here represented as may be regarded preferable for the purposes in view.

The main shaft $b$ has its bearings and is properly supported in uprights $c$, secured to the vessel $a$, the rotation of the shaft being here shown as produced by the action of a helical spring, $d$; but, as is evident, the shaft may derive its motion from a suspended weight or from any other suitable source of power. On the end of the shaft opposite to the spring is a toothed wheel, $e$, which, by gearing into a pinion, $f$, on the shaft $g$, gives rotation to the shaft $g$ and the rotary feeder attached thereto. The inner end of shaft $g$ has a bearing, $h$, on the end of the air-escape tube or pipe $i$, the outer end pressing through a stuffing-box, $j$, as is shown by Fig. 1 of the drawings.

Fig. 2 of the drawings shows the construction of the rotary feeder, which, as will be seen, is made of an exterior shell, $k$, of a cylindrical form, with a contracted part, $e$, within which the open interior end of the air-escape tube $i$ rests, the feeder having also an interior circular plate, $m$, and several air-chambers, $n$, open at both ends, $o$ and $p$.

The feeder is properly attached to its rotating shaft $g$, as indicated at $q$. It will therefore readily be perceived that as the feeder is rotated air will pass into the chamber $n$ through the open end $o$ when this end is above the water, and will pass out of the open end $p$ into the escape-tube $i$ when the end $o$ is in the water and the end $p$ is above the water, so that the feeding of the air will be from the feeder through the escape-tube and to the carbureting air apparatus in regular and measured quantities, which will be delivered slowly or rapidly, as the rotation of the feeder may be arranged and adjusted to operate.

What I claim as my invention, and desire to secure by Letters Patent, is—

An air-feeder open and exposed, and constructed and operated substantially as herein recited.

This specification signed this 31st day of January, 1866.

J. F. BIRCHARD.

Witnesses:
THOS. T. EVERETT.
T. SMITH.